Oct. 24, 1961 HANS-JOACHIM RIEDL ET AL 3,005,684
PROCESS FOR MAKING AMMONIUM BIFLUORIDE
Filed Oct. 25, 1957 3 Sheets-Sheet 1

INVENTORS
HANS JOACHIM RIEDL
JOHANNES DAHMLOS
ATTORNEYS

3,005,684
PROCESS FOR MAKING AMMONIUM BIFLUORIDE

Hans-Joachim Riedl, Recklinghausen, and Johannes Dahmlos, Holtern, Westphalia, Germany, assignors to Wasag-Chemie Aktiengesellschaft, Essen, Germany
Filed Oct. 25, 1957, Ser. No. 694,475
Claims priority, application Germany Oct. 25, 1956
2 Claims. (Cl. 23—88)

This invention relates to a process for making acid ammonium fluoride salt and more particularly stable i.e. non-deliquescent ammonium bifluoride crystals.

Ammonium bifluoride, i.e. the acid ammonium salt of hydrofluoric acid $NH_4H.F_2$ can be produced in various ways, the most common one consisting in causing gaseous ammonia to react with gaseous hydrogen fluoride approximately in the ratio of $NH_3:2HF$ or in using an aqueous solution of either one or both constituents, and subsequently concentrating the same and crystallizing and drying the resultant product.

It is also well known in the art to produce ammonium fluoride by treating solutions of about 30% by weight of industrial fluosilicic acid with an excess of ammonia, and separating the precipitated silicic acid to obtain an ammoniacal solution of ammonium fluoride, which is then concentrated by heating at atmospheric pressure and gives off ammonia from the ammonium fluoride therein. The ammonium fluoride is thereby converted increasingly to ammonium bifluoride as the concentration progresses.

It has been alleged that by steaming off water and ammonia from such concentrated solutions of $NH_4F$, a pure, crystallized non-deliquescent ammonium bifluoride can be obtained.

However, in closely following the teaching of the art, we have found that all known methods do not yield an ammonium bifluoride salt of the aforesaid properties, but they result in, even at further progressive concentration, only a partial conversion of ammonium fluoride to ammonium bifluoride, so that only deliquescent mixed salts of $NH_4F$ and $NH_4F.HF$ are obtained.

The separation of such mixed salts by recrystallization permits one to obtain relatively pure ammonium bifluoride, however, only with very poor rates of yield. Thus heating of ammonium fluoride solutions obtained from commercial fluosilicic acid and ammonia to 125° C. as proposed in the art leads to solutions in which the salt content is comprised of only 40–45% $NH_4F.HF$. We have discovered that cooling such concentrated solutions to crystallize the salt therein must lead to an unsatisfactory mixed salt.

Obviously, the concentration of these solutions of about 40% of salt, which do not boil under atmospheric pressure at the aforesaid temperature, can only consist in a slow vaporization of the solvent medium. Also, we have not been able to convert ammonium fluoride completely to bifluoride at the proposed temperature of 125° and working under atmospheric pressure.

One might naturally assume that concentration of an ammonium fluoride solution by distilling off the solvent, i.e. by causing the solution to boil at higher temperature would be the easiest way to obtain solutions from which pure ammonium bifluoride could be obtained by subsequent cooling and crystallization of the salt. However, we have found that even solutions concentrated in this manner only yielded deliquescent mixed salts of ammonium fluoride and bifluoride.

This was confirmed when following the teaching of the German Patent 634,756 which proposes to continue the concentration of the aforesaid ammonium fluoride solution up to a boiling point of 150° C., the solution loosing further $H_2O$ and $NH_3$. The result is a salt melt which solidifies upon cooling. The preparation of such a melt which is said to contain about 7% of water and about 60° of $NH_4F.HF$, has been suggested in the German patent supra as a first step for the production of hydrogen fluoride $H_2F_2$ which can be driven off from this melt by heating the same with sulfuric acid to a temperature of 160° C., thereby decomposing the fluorides and obtaining a sulfate melt.

We have found that recrystallization in water of the starting melt having 7% water and obtained at 150° C. according to the teaching of the German patent and originally destined for the production of hydrogen fluoride, permits one to obtain a relatively pure ammonium bifluoride, however, only at a rate of yield of 36%, which is far too unsatisfactory for the commercial production of $NH_4F.HF$ from fluosilicic acid.

It appeared possible to obtain an increased yield of pure recrystallized ammonium bifluoride, only if the content of $NH_4F.HF$ in the crude salt from the melt could be increased above 60%. It was generally assumed that this could not be done by further increasing the temperature during the concentration step, since it was thought that the sublimation of $NH_4F.HF$ occurring above 150° C. would defeat the purpose of increasing the bifluoride yield, and the highly corrosive properties of the melt would lead to a dissolution of increased quantities of the melt container, thereby increasing the amount of impurities in the melt and making the entire process impracticable.

It is, therefore, an object of our invention to provide a process for the production of pure substantially unhygroscopic non-deliquescent ammonium bifluoride which is stable in a climate of normal humidity, from industrial fluosilicic acid solutions and ammonia, at rates of yield in the order of 80% and higher.

It is another object of our invention to obtain the aforesaid product from industrial fluosilicic acid and ammonia at rates of yield in the order of 80% and higher without recrystallization directly in pure crystallizable form.

These objects are attained and the abovementioned drawbacks avoided by the process for making ammonium bifluoride from industrial fluosilicic acid and on a commercial scale, according to our invention, which comprises the steps of (A) treating an aqueous solution of industrial fluosilicic acid with gaseous ammonia, (B) separating from the solution the precipitated silicic acid, (C) concentrating the resultant solution by heating the same to boiling at a temperature above 150° C. so as to distill off the solvent, and (D) interrupting the concentration as soon as a control sample shows a distinctly acid odor, when cooled; and, as an additional step, (E) breaking up the solidifying melt into small pieces, while the solidification thereof progresses, so as to increase the solidifying velocity and drive off additional water by the effect of the released heat of solidification.

We have also found that by carrying out the above step (C) up to a temperature of 160° C. and higher, a crude salt can be obtained which contains not more than 5%, and preferably only about 3 to practically 0% of water, and at least about 75% of ammonium bifluoride.

If the distillation is interrupted at 160° C. a crude salt containing about 2% of water and about 75% of ammonium bifluoride is obtained. This is satisfactory for the industrial production of a high purity, non-deliquescent ammonium bifluoride by a recrystallization step (E) of the crude salt, which step will be described further below.

At this temperature of 160° C., a certain amount of bifluoride is lost through sublimation. However, we have found that up to distillation temperatures of about 170°

C., these losses are so negligible that they do not adversely affect the economical efficiency of the process when applied industrially.

If the distillation temperature is further raised to about 170°–200° C. and in particular to about 190°–200° C., melts of crude salt are obtained which are substantially free from water and in which the conversion of ammonium fluoride to ammonium bifluoride is substantially complete. However, in this case, the sublimation losses of ammonium bifluoride can no longer be neglected.

These losses can be avoided completely, according to a further feature of our invention, by use of a fractionating or distillation column, which is operated at a temperature interval.

The column may be heated electrically, with superheated steam or a suitable heating fluid. The parts of the column exposed to contact with the bifluoride are preferably made of lead, alloyed steel, graphite or carbon.

If the distillation is continued to obtain a melt free from water, this melt consists practically only of ammonium bifluoride, and a subsequent recrystallization step can be dispensed with. Recrystallization is, on the other hand, required, if the melt still contains $NH_4F$.

In the production of ammonium bifluoride on an industrial scale according to the process of our invention, we usually interrupt the distillation at a temperature at or somewhat above 160° C. when the melt contains about 75% of ammonium bifluoride and about 2–3% of water.

The next-following steps in the process according to our invention then comprise the abovementioned cooling step (E) accompanied by solidifications of the melt and preferably by breaking the same up during the step, and (F) recrystallization of the resultant crude salt.

For this purpose and to find the best mode of carrying out recrystallization step (F), we have further carefully determined the temperature-solubility curves of ammonium silicohexafluoride, ammonium bifluoride, and ammonium fluoride in water and of ammonium fluoride in concentrated ammoniacal solution, which data were not hitherto known.

With the aid of these determinations, we carry out the recrystallization of the aforesaid crude salts having an $NH_4F \cdot HF$ content of about 75%, in such a manner as to obtain, selectively, either large, elongated prismatic crystals, or fine crystalline needles, of pure, non-deliquescent ammonium bifluoride.

The first-mentioned final product is obtained by (I) dissolving the crude salt of about 75% content of $NH_4F \cdot HF$ at a temperature of 70–80° C. in water, the amount of which is preferably about half the quantity (by weight) of the crude salt, (II) filtering the same in a filter of plastic material such as, for instance, polyethylene, in order to remove therefrom any impurities introduced by corrosion of the melt container, i.e. for instance lead or stainless steel, then (III) slowly cooling the filtrate down to room temperature, and (IV) continuing the cooling slowly with ice to 0° C. or therebelow. $NH_4F \cdot HF$ is obtained as long prismatic needles.

The last-mentioned final product is obtained, if the cooling step (IIIa) is carried out rapidly under stirring down to a temperature of 0° C.

After the crystallization is complete, the salt is separated from the mother liquor by filtration or centrifuging (V), then washed in ice water (0° C.) and finally dried at about 70–80° C. The yield of dry salt by weight amounts to at least half the weight of the crude salt and corresponds most satisfactorily with the theoretical amount to be expected, when the bifluoride content of the crude salt produced according to the invention is 75%, based on a solubility of $NH_4F \cdot HF$ at 0° C. which was found by us to be 40 g. in 100 g. of water.

According to another important feature of our invention, we carry out the recrystallization step in such a manner as to obtain a bifluoride crystallizate which is substantially free from ammonium fluosilicate, which is usually present in small quantities in the crude salt.

As a further step in the process of the invention, the mother liquor from the first recrystallization step (F) can be reintroduced (step G) to a renewed concentration (C) to obtain crude salt according to the invention as described hereinbefore, which crude salt can then be treated in a second recrystallization, whereby a second crystallizate of ammonium bifluoride can be obtained which has substantially the same degree of purity as the first crystallizate and can be combined with the latter so as to raise the total yield.

It is, however, not recommendable to repeat the process steps of concentration and recrystallization (G, C, F). This would involve the risk that ammonium fluorsilicate might crystallize together with the ammonium bifluoride (namely, if the fluosilicate content rises to 12 g. $(NH_4)_2SiF_6$ in 100 g. of water at 0° C.).

We, therefore, prefer, as a step (H), to reintroduce the second and, under certain conditions, already the first mother liquor into the first stage (A) of the process of our invention, adding thereto fresh fluosilicic acid and gaseous ammonia.

Contrary to certain statements in the literature, the dry ammonium bifluoride crystals obtained according to the invention are little or completely unhygroscopic, non-deliquescent, and therefore fully stable in the surrounding air if the latter has a normal degree of humidity. Due to its high degree of purity, this final product is very well suited for use in etching glass and as a starting material for other compounds of fluorine.

Our invention will be further explained hereinafter in connection with the accompanying drawings in which.

Figure 1:
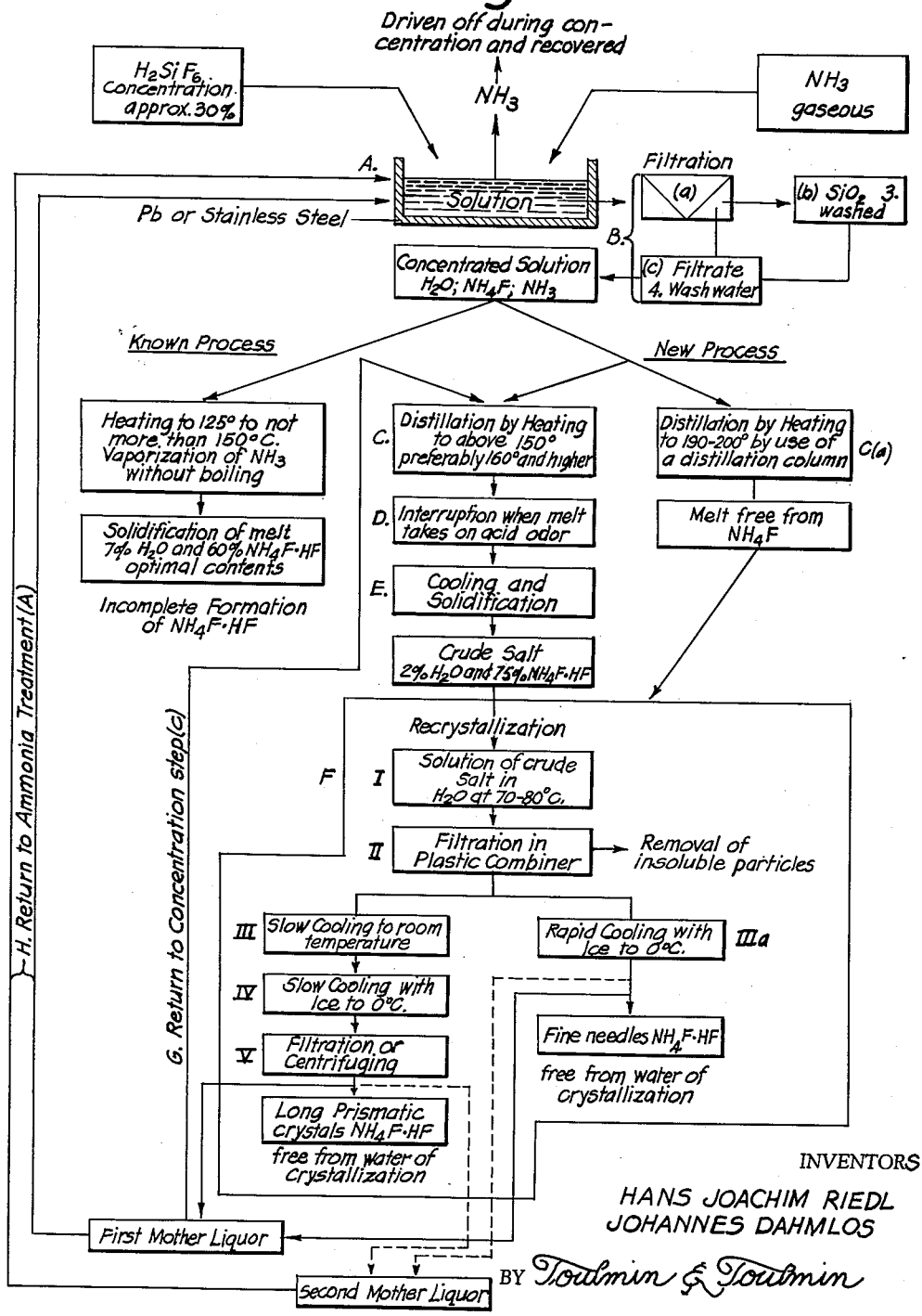
FIGURE 1 is a flowsheet showing a known process compared with the process according to our invention.

The flowsheet of FIGURE 1 shows the above-described steps of:

A. Ammonia Treatment: A solution of fluosilicic acid having a concentration preferably of about 30% by weight is stirred and gaseous ammonia is introduced into the same. The exothermic reaction and the temperature is maintained at 40° C. by adequate cooling. Silicic acid is thus precipitated in easily filtrable form.

B(a) Filtration,

B(b) Washing of separated silicic acid, and

B(c) Uniting of filtrate from step 2 and wash water from 3.

The resulting aqueous strongly ammoniacal solution of ammonium fluoride was formerly processed according to a known process illustrated for the sake of comparison at the left, while we treat the same by the new process according to our invention which comprises the steps of C. Concentration by heating to 160° C. or higher.

D. Preferably interrupting the concentration when the melt takes on an acid odor. The resultant crude salt contains about 2% of $H_2O$ and about 75% of $NH_4F \cdot HF$.

E. Cooling and solidifying the melt, preferably while stirring and breaking up the solidifying crust into small pieces while the melt cools off.

In another mode of operation, step C(a) comprises distilling the solution at temperatures up to 190°–200° C., so as to obtain a pure water-free $NH_4F \cdot HF$ by complete conversion of all $NH_4F$ in the melt and avoiding losses of $NH_4 \cdot HF$ by sublimation by use of a distillation column or the like apparatus.

The crude salt obtained from steps C, D, E or C(a) is then treated by the following steps of stage.

F. Recrystallization.

I. Dissolution of the crude salt in water at 70–80° C.

II. Filtration in a plastic filter to separate insoluble impurities at a temperature of 70–80° C.

III. Slow cooling to room temperature (20° C.), and

IV. Continued cooling with ice to about 0° C., to obtain large crystals of NH₄F.HF free from water of crystallization, or IIIa. Rapid cooling with ice to 0° C., to obtain small, fine needles of NH₄F.HF free from crystal water.

V. Separation of crystallizate from another liquor, washing and drying of crystals.

G. The (first) mother liquor from step V is recycled into the heat concentration step C or C(a) of the process according to the invention with repetition of steps D, E and F; and/or H. The first mother liquor, if necessary, and always the second mother liquor from (V) is then recycled into the starting solution to be treated together with a new batch of fluosilicic acid dissolved therein with gaseous ammonia (step A of the process).

Figure 2:
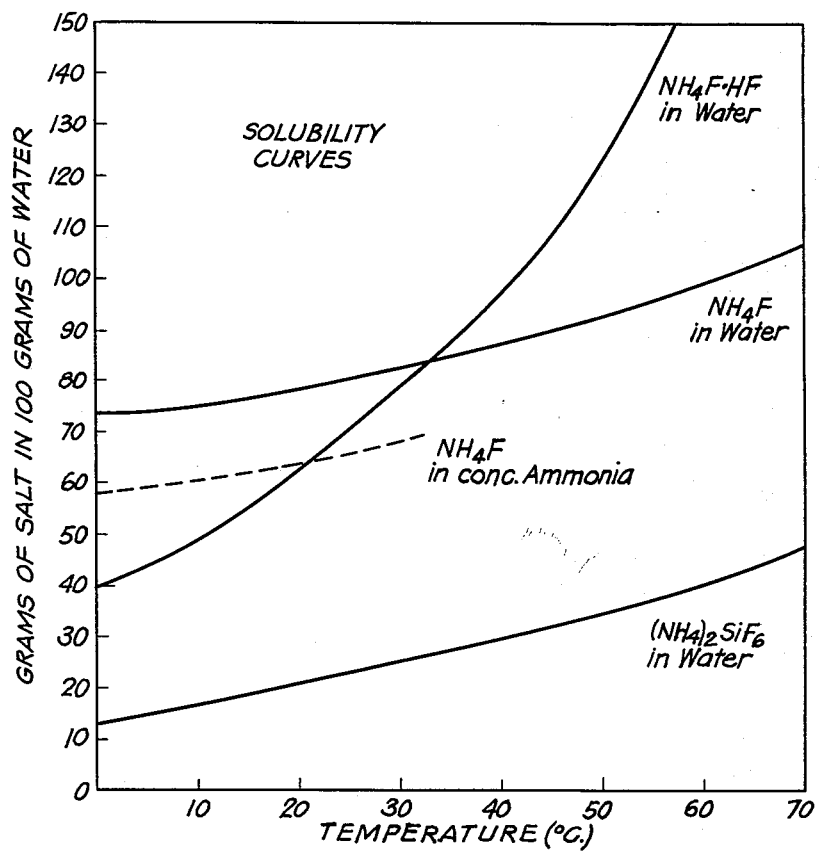
FIGURE 2 is a graph showing the temperature-solubility curves determined by us.
Figure 3:
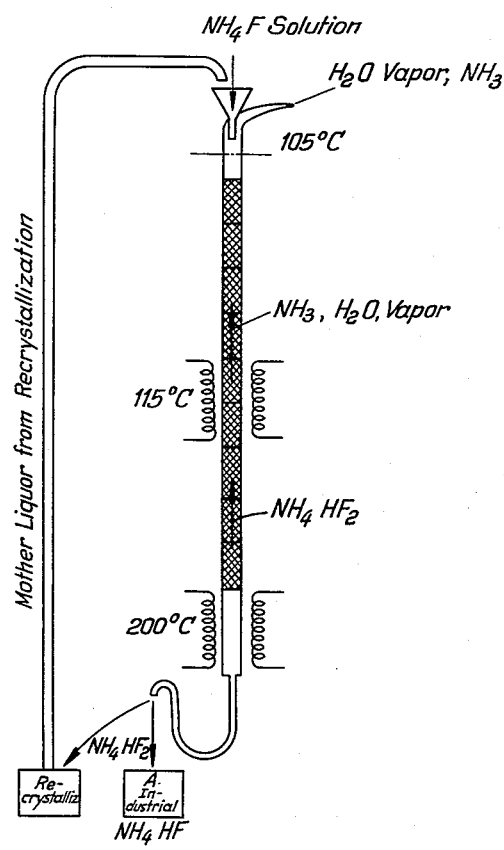
FIGURE 3 is a self-explanatory, schematic diagram of apparatus used for the practice of the process of this invention.

FIGURE 2 shows in a graph the solubilities (in grams of salt per 100 grams of water) of ammonium bifluoride, ammonium fluoride, ammonium fluosilicate, and ammonium fluoride in a concentrated ammoniacal solution in water, determined by us, whereby we have found that at about 35° C., ammonium fluoride and bifluoride have the same solubility in water while ammonium bifluoride is more soluble in water above, and ammonium fluoride is more soluble in water below that temperature.

Bearing this discovery in mind, we shall now describe our invention in further detail with the aid of a number of examples, which are, of course, not intended to be limitative of the scope of the invention.

Examples I and II are based on the known art and are given for the sake of comparison, and in order to set forth more clearly the advantages of our present invention.

*Example I*

An ammonium fluoride solution obtained in a conventional manner from industrial fluosilicic acid and gaseous ammonia (flowsheet, step B(a–c)) and having a salt content of about 50 grams (g) per 100 g. of water is heated until the boiling point of the solution reaches 125° C. Analysis of the resulting solution shows that it contains 250 g. of salt per 100 g. of water, and that the NH₄F.HF content of the salt is now 45%, i.e. the solution contains 112.5 g. of NH₄F.HF and about 137.5 g. of NH₄F.

On the basis of the solubility curves of FIGURE 2 determined by us, it will be easily understood that cooling of this solution from 125° C. downward will first lead, at about 90° C., to a crystallization of ammonium fluoride, while, at about 46° C., ammonium bifluoride will begin to crystallize, the final crystallizate obtained upon further cooling being a mixed salt of both fluorides.

*Example II*

Experiment I is repeated, however, the temperature of the solution is raised to 150° C. as proposed in the art. More water and ammonia are expelled from the solution until the bifluoride content of the resulting salt melt is about 60% and the water content about 10%. By carrying out this example to obtain 250 g. of crude salt, the same would contain 150 g. of NH₄F.HF and 100 g. of NH₄F. It is possible to obtain pure ammonium bifluoride from this melt by recrystallization. The solubility curves of FIGURE 2 show, that at 0° C., which is an easily attainable crystallization temperature, NH₄F has a solubility of 73 g./100 g. H₂O while NH₄F.HF has a solubility of 40 g./100 g. H₂O.

The minimum amount of water in which the 250 g. salt must be dissolved so that the ammonium fluoride will stay in solution and only bifluoride will crystallize has then been determined by us to be 137.5 grams or 550 g. of water for 1 kilogram of crude salt. In the resulting solution, the concentrations will be $$\frac{150 \cdot 100}{137.5} = \text{about 109 (g. 100 g. H}_2\text{O) of NH}_4\text{F.HF}$$

and $$\frac{100 \cdot 100}{137.5} = \text{just below 73 (g. 100 g. H}_2\text{O) of NH}_4\text{F}$$

When cooling this solution to 0°, all ammonium fluoride will remain in solution and at least theoretically $$\frac{(109-40) \cdot 137.5}{100} = \text{about 95 g. pure ammonium bifluoride}$$

will be obtained from 250 g. crude salt. As has been stated hereinbefore, this is less than 38%. In practice, only about 360 g., NH₄F.HF are obtained per kilogram of crude salt, or only about 36% of the crude salt dissolved for recrystallization.

If less water is used for the recrystallization step or if the temperature of crystallization is decreased below 0° C., more crystallizate is obtained which, however, contains inevitably certain amounts of ammonium fluoride and consists of the well known deliquescent salt.

Examples I and II demonstrate that even when the concentration is carried out at temperatures up to 150° C. the conversion of fluoride to bifluoride is still too incomplete to permit production of really pure bifluoride with a satisfactory yield.

The process according to our invention shall be illustrated in detail by the following Examples III and IV.

*Example III*

A cylindrical container made of stainless steel and having a capacity of about 2 liters, a diameter of 12 centimeters and a height of 17.5 cm. is filled with 1.0 kilogram (kg.) of industrial fluosilicic acid having a content of 26.7% by weight, or 267 grams of H₂SiF₆. The vessel is then closed with a tightly sealed, removable lid having three openings. Each opening is provided with a socket, and a stirring device, preferably of plastic material such as polyethylene is provided in the housing, the shaft of which device passes through the central one of the aforesaid three openings. An air tight seal is, for instance, provided by a sleeve of stainless steel provided in that central opening and surrounding the stirrer shaft. Pipes are connected to the sockets of the other two openings in the lid and serve for the introduction and removal of gaseous ammonia.

The ammonia inflow pipe is enlarged in the interior of the vessel to provide it with a bell-shaped mouth-piece and opens somewhat above the liquid level in the container. Gaseous ammonia is introduced at a rate of flow of about 150 liters per hour, while the content of the vessel is stirred with the agitator of plastic material.

The vessel is equipped with a cooling mantle, and, if necessary with a cooling spiral piping, through which water having a temperature of 15° C. is passed as a coolant. During the course of one hour the temperature of the outflowing coolant rises to about 40° C. and thus begins to decrease slowly. The introduction of gaseous ammonia is continued until the discharged coolant shows a temperature of about 35° C.

In a treatment lasting for about 3 hours, a quantity of about 300 grams of ammonia is absorbed by the solution in the vessel. The contents of the vessel is then filtered in a filter press of stainless steel.

The silicic acid retained in the filter press is washed repeatedly with hot water and is then pressure-filtered to dryness.

Due to the coarse-grained nature of the precipitated silicic acid, filtration is not difficult and requires only a few minutes (5–10) depending on the size of the filter.

In order to obtain the crude salt according to the invention, the filtrate and the wash waters are united in a concentrating plant which is preferably of stainless steel.

The boiling temperature of the salt solution is controled with the aid of a thermometer the lower end of which, dipping into the solution, is clad with a stainless steel hull.

As soon as the temperature of the treated contents of the vessel has risen to 160° C.—a control sample, when solidifying, shows then an acid odor instead of the initial ammoniacal one—heating is interrupted.

During the subsequent cooling-off period, the solidifying melt is preferably stirred and the solidified crust broken up into small pieces by means of a stirrer of plastic material. The crude salt is then obtained in finely divided form and in an amount of about 350 g.

An analysis of the crude salt shows the following results:

|  | Percent |
|---|---|
| $NH_4F.HF$ | 70–80 |
| $NH_4$ | 15–25 |
| $(NH_4)_2SiF_6$ | 1–2 |
| Water | 2–3 |

The comminuted crude salt is then dissolved at 70–80° C. in a quantity of water amounting to about half the weight of the crude salt, i.e. to about 175 grams for the purpose of recrystallization.

In order to remove small amounts of insoluble impurities, the hot solution is filtered into a container of plastic material (for instance a commercially available polyethylene vessel).

Referring to the solubility graph of FIGURE 2, the hot recrystallization solution contains therefore about 147.5 g. of $NH_4F.HF$ and about 49 g. of $NH_4F$ per 100 g. of $H_2O$.

While the hot solution is cooling down slowly to room temperature, ammonium bifluoride crystallizes in long prismatic crystals of considerable size. The crystallization will be completed by subsequent cooling with ice to 0° C. It will be easily seen from the solubility graph of FIGURE 2, that a theoretical yield of pure $NH_4F.HF$ of $$\frac{(147.5-40)\cdot 175}{100} \simeq 188 \text{ g.}$$

can be expected. In every 100 grams of water, 40 g. of $NH_4F.HF$ as well as the entire above-mentioned amount of 49 g. of $NH_4F$, both per 100 g. of $H_2O$, will remain dissolved at 0° C., the saturation rate of $NH_4F$ being 73 g. at that temperature.

The crystallizate is then suction filtered to free the same substantially completely from all adherent mother liquor, and is then washed twice with 0.25 liter of ice water.

The washed crystallizate is then placed on a plate of plastic material or stainless steel, and is dried at 70 to 80° C. while occasionally stirring the same with a plastic or stainless steel shovel.

Instead of the above theoretical amount of 188 grams, an amount of dry ammonium bifluoride of 185 grams is obtained.

The mother liquor and wash waters of this first bifluoride crystallizate are then again processed according to steps C, D, E, and F, or according to steps C(a) and K, and a further amount of 95 g. of pure ammonium bifluoride is obtained.

The secondary mother liquor and wash waters from this second processing step are returned to step (A) of the process by dissolving therein a new batch of 1.0 kg. of fluosilicic acid and repeating the treatment according to this example.

In this manner a sequence of five batches of a total of 5.0 kg. of industrial fluosilicic acid, corresponding to 1.34 kg. of $H_2SiF_6$, yield about 1.4 kg. of crystalline ammonium bifluoride. Disregarding the salt remaining in the ultimate secondary mother liquor, this amount corresponds to a yield of about 88% by weight of the theoretically obtainable amount (theoretical amount 1.59 kg. $NH_4F.HF$ from 1.34 by $H_2SiF_6$).

The combined salt of first and second crystallizate shows, for instance, the following analysis:

|  | Percent |
|---|---|
| $NH_4F.HF$ | 99.76 |
| $NH_4F$ |  |
| $(NH_4)_2SiF_6$ | 0.12 |
| Non-volatile impurities | 0.12 |

Example IV

By treating 10 kg. of industrial fluosilicic acid having a content of 24.4% of $H_2SiF_6$, in the same manner as described in the preceding example, with a total of 3.0 kg. of gaseous ammonia and subsequent filtering and washing treatment as described, about 12.0 kg. of an aqueous solution of ammonium fluoride are prepared.

In order to obtain a crude salt of high $NH_4F.HF$ content, the $NH_4F$ solution is charged into the feed inlet of a column apparatus of stainless steel having a length of 100 cm. and a width of 4 cm., which column apparatus is charged with a filling of graphite lumps ("diabon" manufactured by Chem. Fabrik Griesheim). The column apparatus is heated by an external electrical heating coil.

At its upper and at its lower end as well as in the middle this column apparatus is provided with pipe sockets protruding into the interior of the column, and through which sockets thermometers are introduced thereinto.

The solution is fed to the column apparatus at such a rate, and the heating of the column is so controlled that the temperature at the upper end of the column is preferably maintained at about 105° C.; the central zone should have a temperature of about 115° C. and at the lower end of the column, a temperature of about 200° C. is maintained.

The melt of crude salt flows from the lower end of the column through an overflow pipe into a recipient vessel of stainless steel and solidifies therein. About 3.1 kg. of crude salt are obtained which has a content of 1% to 2% of ammonium fluosilicate and is practically free from ammonium fluoride.

The excess of ammonia and water vapor escape through an outlet pipe provided at the head of the column apparatus and are passed through a refrigerated condenser. The condensate is gathered at the outflow end of the condenser and consists of an aqueous ammoniacal solution of about 15% $NH_3$ content.

In order to free the ammonium fluoride thus obtained from the content of ammonium fluosilicate, recrystallization is carried out as described in Example III by dissolving the same in 2.0 kg. of water. About 2.2 kg. of pure crystalline ammonium bifluoride are thereby obtained.

The mother liquor from this recrystallization step can be recirculated through the column, or through the concentration step described in Example III, and a second crystallizate of ammonium bifluoride is obtained, the degree of purity of which is almost as high as that of the first crystallizate.

The resultant secondary mother liquor is recycled together with a fresh batch of fluosilicic acid subjecting the resulting solution to the above-described ammonia treatment.

By thus recycling the mother liquors a continuous production of pure crystalline ammonium bifluoride from fluosilicic acid is effected with yields in the order of 90%.

It will be understood that this invention is susceptible to further modification and, accordingly, it is desired to comprehend such modifications within this invention as may fall within the scope of the appended claims.

What we claim is:

1. In a process for producing ammonium bifluoride from industrial fluosilicic acid by treatment with sufficient ammonia to form a precipitate of silicic acid and a solution of ammonium fluoride, separating said precipitate, and concentrating the resulting ammonium fluoride containing solution by distilling off water and ammonia, the improvement comprising the steps of feeding an aqueous solution of ammonium fluoride into the upper end of a distillation column heated at its lower end to about 200° C., at such rate that the temperature at the upper end of the column is maintained at about 105° C., and the temperature in the central zone of the column is maintained at about 115° C., withdrawing the resulting melt of ammonium bifluoride which is practically free from ammonium fluoride, continuously from the lower end of the column, solidifying the melt, recrystallizing the solidified crude ammonium bifluoride from water, and recycling the mother liquor from the recrystallization step continuously into the column through the top end thereof countercurrently to the excess gases consisting of sublimating ammonium bifluoride, ammonia and water vapors resulting from the conversion of ammonium fluoride to ammonium bifluoride, thereby continuously retaining the sublimating ammonium bifluoride in the process while the gaseous ammonia and water vapor leave the column at the top end of the latter.

2. The process described in claim 1 wherein the distillation column is filled with packing made of graphite lumps.

References Cited in the file of this patent

UNITED STATES PATENTS

| | | |
|---|---|---|
| 1,235,552 | Chappell | Aug. 7, 1917 |
| 2,446,484 | McClenaham | Aug. 3, 1948 |
| 2,816,818 | Gross | Dec. 17, 1957 |
| 2,865,711 | Gloss | Dec. 23, 1958 |

FOREIGN PATENTS

| | | |
|---|---|---|
| 634,756 | Germany | Jan. 7, 1937 |

OTHER REFERENCES

Depew: "Transactions of the American Institute of Chemical Engineers," 41, 711–15 (1945).